United States Patent
Tessier et al.

(10) Patent No.: US 11,390,045 B2
(45) Date of Patent: Jul. 19, 2022

(54) MOLDING ASSEMBLY AND METHOD OF CO-CURING STIFFENER WITH PANEL

(71) Applicant: Bell Helicopter Textron Inc., Fort Worth, TX (US)

(72) Inventors: Sylvain Tessier, Fasset (CA); Pascal Forget, St-Jérôme (CA)

(73) Assignee: Textron Innovations Inc., Providence, RI (US)

( * ) Notice: Subject to any disclaimer, the term of this patent is extended or adjusted under 35 U.S.C. 154(b) by 194 days.

(21) Appl. No.: 16/125,592

(22) Filed: Sep. 7, 2018

(65) Prior Publication Data
US 2020/0079038 A1 Mar. 12, 2020

(51) Int. Cl.
*B29C 70/54* (2006.01)
*B29C 70/44* (2006.01)

(52) U.S. Cl.
CPC .......... *B29C 70/54* (2013.01); *B29C 70/443* (2013.01)

(58) Field of Classification Search
None
See application file for complete search history.

(56) References Cited

U.S. PATENT DOCUMENTS

| | | | |
|---|---|---|---|
| 4,492,607 A | 1/1985 | Halcomb | |
| 5,059,377 A * | 10/1991 | Ashton | B29D 99/0014 264/257 |
| 5,135,382 A * | 8/1992 | Tsuchiya | B29C 33/22 425/330 |
| 5,190,773 A | 3/1993 | Damon | |
| 5,242,523 A | 9/1993 | Willden et al. | |
| 6,502,788 B2 | 1/2003 | Noda et al. | |
| 6,702,911 B2 | 3/2004 | Toi et al. | |
| 6,802,931 B2 | 10/2004 | Fujihira | |
| 7,141,199 B2 | 11/2006 | Sana et al. | |
| 7,293,737 B2 | 11/2007 | Engwall et al. | |

(Continued)

FOREIGN PATENT DOCUMENTS

| | | |
|---|---|---|
| CN | 105873738 A | 8/2016 |
| EP | 1537981 A1 | 6/2005 |

(Continued)

OTHER PUBLICATIONS

Byrd, Larry W.; "Effectiveness of z-pins in preventing delamination of co-cured composite joints on the example of a double cantilever test"; Composites: Part B Engineering vol. 37 Issues 4-5 (2006) 365-378; 14 pages.

(Continued)

*Primary Examiner* — Matthew J Daniels
*Assistant Examiner* — Andrew L Swanson
(74) *Attorney, Agent, or Firm* — Lightfoot & Alford PLLC

(57) ABSTRACT

There is disclosed a molding assembly including a mold having a first surface and an opposed second surface. The mold defines a cavity bounded by two side walls converging toward each other from the first surface toward the second surface. Two mandrels are each removably receivable in the cavity and have a first wall, a second wall opposed to the first wall, an inner wall, and an outer wall opposed to the inner wall. The inner walls face each other and define a gap therebetween for receiving a composite material to be cured.

(Continued)

The outer walls are angled and each slidably engage a respective one of the two side walls. A method of co-curing a stiffener and a panel is also disclosed.

19 Claims, 3 Drawing Sheets

(56) References Cited

U.S. PATENT DOCUMENTS

| | | |
|---|---|---|
| 8,042,767 B2 | 10/2011 | Velicki et al. |
| 8,096,504 B2 | 1/2012 | Arevalo et al. |
| 8,460,502 B2 | 6/2013 | Bergmann et al. |
| 9,776,386 B2 | 10/2017 | Garcia Solares et al. |
| 2001/0035249 A1* | 11/2001 | Kondo ............... B29D 99/0003 156/65 |
| 2001/0040317 A1* | 11/2001 | Shiraishi ................ B29C 43/18 264/510 |
| 2002/0027187 A1* | 3/2002 | Sato ...................... B29C 70/543 249/187.1 |
| 2010/0239865 A1* | 9/2010 | Kallinen ................ B29C 70/46 428/411.1 |
| 2010/0314807 A1* | 12/2010 | Lengsfeld ............. B29C 70/543 264/571 |
| 2011/0315307 A1 | 12/2011 | Perez Pastor et al. |
| 2014/0353876 A1* | 12/2014 | Murai ..................... B29C 33/00 264/331.11 |
| 2014/0360657 A1* | 12/2014 | Murai ................... B29C 70/543 156/245 |

FOREIGN PATENT DOCUMENTS

| | | |
|---|---|---|
| WO | 2008007043 A1 | 1/2008 |
| WO | 2017068497 A1 | 4/2017 |

OTHER PUBLICATIONS

Huang, C.K.; "Study on co-cured composite panels with blade-shaped stiffeners"; Composites: Part A Applied Science and Manufacturing vol. 34, Issue 5 (2003) 403-410; 8 pages.

Canadian Exam Report in related Canadian Patent Application No. 3,018,121 dated Jul. 16, 2019, 4 pages.

Canadian Exam Report in related Canadian Patent Application No. 3,018,121 dated Feb. 18, 2020, 3 pages.

* cited by examiner

MOLDING ASSEMBLY AND METHOD OF CO-CURING STIFFENER WITH PANEL

TECHNICAL FIELD

The application relates generally to composite parts manufacturing and, more particularly, to assemblies and methods used to manufacture composite panels with stiffeners.

BACKGROUND

Many composite articles, for example, composite structural panels of a helicopter, require stiffening members to enhance the structural strength of the structural panel. To ensure that such composite articles are functional for their intended purpose, the stiffening members are separately formed, and subsequently rigidly mounted to the structural panel.

SUMMARY

According to an aspect, there is provided a molding assembly, comprising: a mold having a first surface and an opposed second surface, the mold defining a cavity being bounded by two side walls converging toward each other from the first surface toward the second surface, the cavity having a centerline axis extending between the first and second surfaces and spaced equidistantly from the side walls; and two mandrels each being removably receivable in the cavity and having a first wall, a second wall opposed to the first wall, an inner wall, and an outer wall opposed to the inner wall, the inner wall and the outer wall extending from the first wall to the second wall, the inner walls facing each other and defining a gap therebetween upon the two mandrels being received in the cavity, the gap configured for receiving a composite material to be cured, the outer walls being angled and each slidably engaging a respective one of the two side walls.

According to another aspect, there is provided a method of co-curing a panel and a stiffener extending therefrom, the method comprising: placing a first pre-impregnated segment of the stiffener between inner walls of two mandrels and placing a second pre-impregnated segment of the stiffener on first walls of the mandrels being transverse to the inner walls; inserting the first and second pre-impregnated segments of the stiffener and the mandrels in a cavity of a mold and abutting angled outer walls of the mandrels against correspondingly angled side walls of the mold; placing a pre-impregnated segment of the panel over the second pre-impregnated segment of the stiffener and over a surface of the mold; applying pressure on the first walls of the mandrels to move the mandrels toward each other such that the mandrels apply pressure on the first pre-impregnated segment of the stiffener disposed therebetween; and curing the pre-impregnated segment of the panel and the first and second pre-impregnated segments of the stiffener.

According to another aspect, there is provided a molding assembly, comprising: a mold having a first surface and an opposed second surface, and a cavity extending inwardly from the first surface toward the second surface, the cavity being bounded by two side walls converging toward each other from the first surface toward the second surface, the cavity having a centerline axis extending between the first and second surfaces and spaced equidistantly from the side walls; two mandrels each having a first wall, a second wall opposite to the first wall, an outer wall, and an inner wall opposite to the outer wall, the inner and outer walls extending between the first and second walls, the mandrels being removably insertable into the cavity to position the outer walls adjacent to the side walls of the cavity and to position the inner walls facing toward each other, the inner walls being spaced apart and defining a gap therebetween to receive a segment of a composite material to be cured; and a vacuum bag to enclose the mold, the mandrels and the composite material, the vacuum bag operable to generate a pressure applicable against the first walls of the mandrels to displace the mandrels into the cavity toward the second surface of the mold, displacement of the mandrels slidingly displacing the outer walls against the side walls of the cavity and displacing the inner walls toward each other in a direction transverse to the centerline axis to abut against the segment of the composite material in the gap.

DESCRIPTION OF THE DRAWINGS

Reference is now made to the accompanying figures in which.

DETAILED DESCRIPTION

Figure 1:
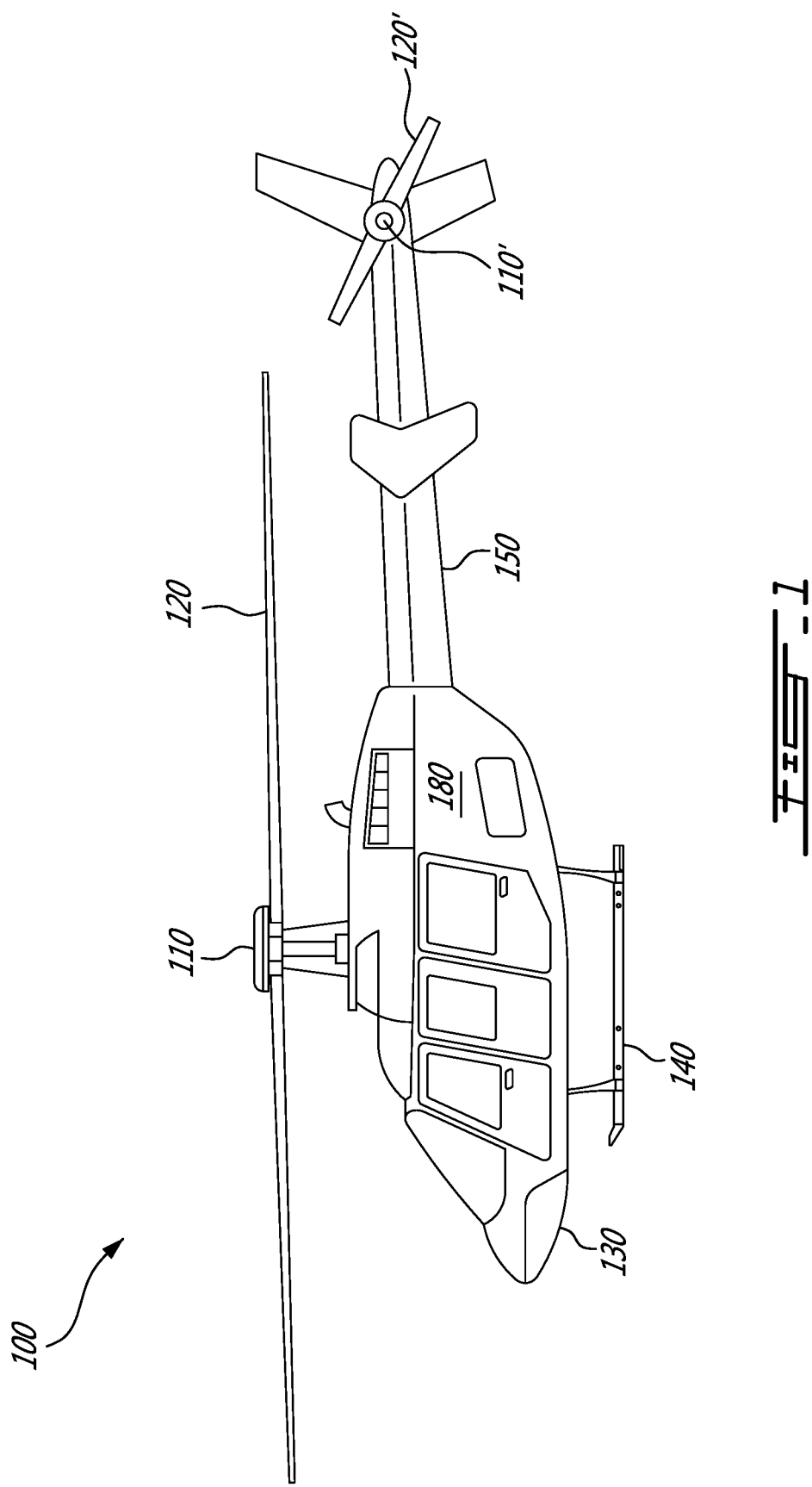
FIG. 1 is a schematic side view of a rotorcraft in accordance with a particular embodiment.

FIG. 1 shows a rotorcraft 100 according to one example embodiment. Rotorcraft 100 features a rotor system 110, blades 120, a fuselage 130 defining a cabin 180, a landing gear 140, and an empennage 150. Rotor system 110 rotates blades 120. Rotor system 110 includes a control system for selectively controlling the pitch of each blade 120 in order to selectively control direction, thrust, and lift of rotorcraft 100. Fuselage 130 represents the body of rotorcraft 100 and is coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120.

Figure 2:
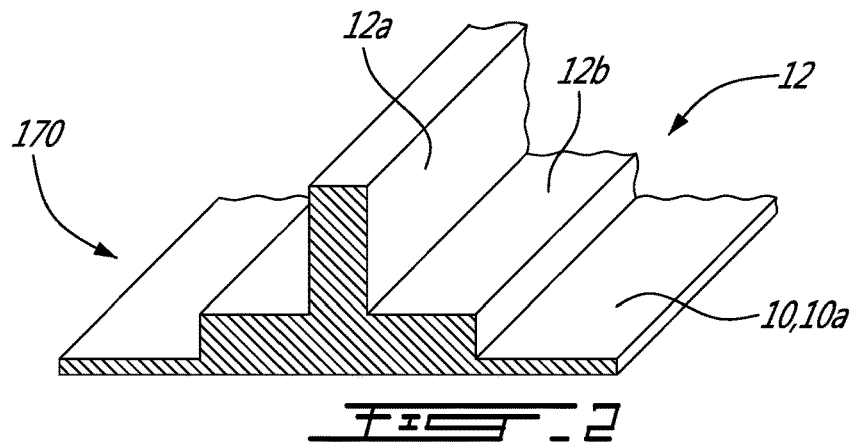
FIG. 2 is a schematic tridimensional view of a composite structure having a stiffener secured to a panel.

Referring now to FIG. 2, a portion of a structure of the rotorcraft 100 is shown. The structure includes at least one panel 10 and stiffeners 12, only one being shown, secured to the panel 10. In the depicted embodiment, the stiffener 12 is a T-shaped stiffener. The stiffener 12 has a web and a flange secured to the web and that are respectively made from a first composite segment 12a and a second composite segment 12b which are integral with one another and which define the "T" final shape of the stiffener 12. The panel 10 includes a panel composite segment 10a which is also integral with the first and second composite segments 12a, 12b of the stiffener 12. The first and second composite segments 12a, 12b of the stiffener 12, and the composite panel segment 10a, are formed from preforms of pre-impregnated layers of composite materials and cured together to achieve their integrality and shape.

Herein, pre-impregnated means "uncured". It is understood that the term "uncured" as used herein is intended to include material that is partially cured to facilitate handling, but still flexible so as to allow forming to a desired shape, including, but not limited to, pre-impregnated material including B-Stage resin. Alternatively, dry fibers embedded in resin may be used. Curing may be performed using any suitable method.

The panel 10 and the stiffeners 12 are cured together, or "co-cured", such that the panel 10 and the stiffeners 12 are integral with each other, and monolithic after the curing process. In a particular embodiment, having the panel 10 and the stiffeners 12 "co-cured" and being monolithic allows avoiding an assembly operation (i.e., securing the stiffeners 12 to the panel 10), which might translate in time savings. Moreover, as the operation of assembling the stiffeners 12 to the panel 10 is not required, there is no need for a tool used for carrying out this operation. This might result in costs savings. In a particular embodiment, having the panel 10 and the stiffeners 12 "co-cured" and being monolithic may also save weight as there is no need for fasteners for securing the stiffeners 12 to the panel 10.

Figure 3:
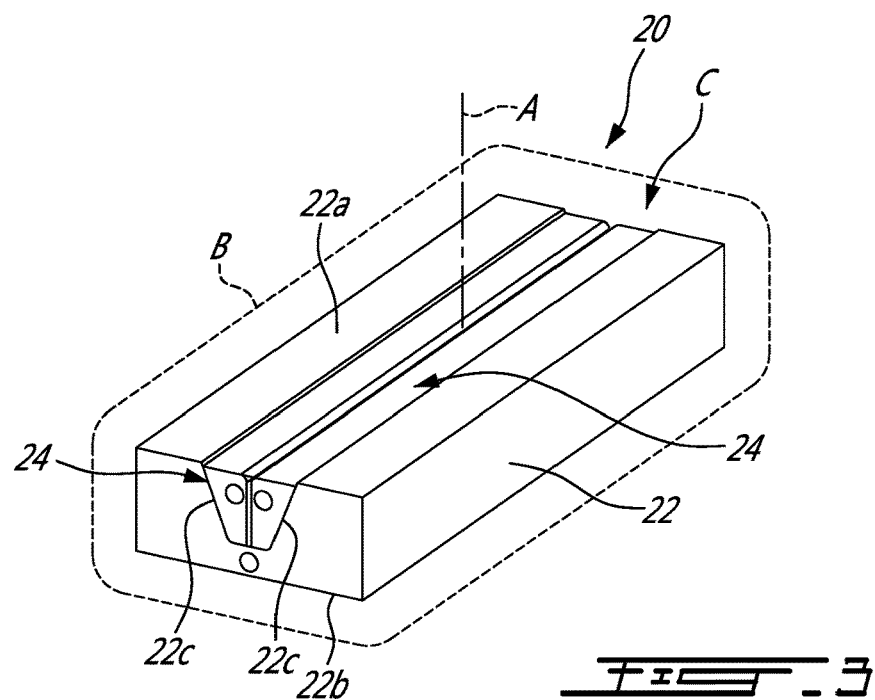
FIG. 3 is a schematic tridimensional view of a molding assembly in accordance with a particular embodiment, to form the stiffener secured to the panel shown in FIG. 2.
Figure 4:
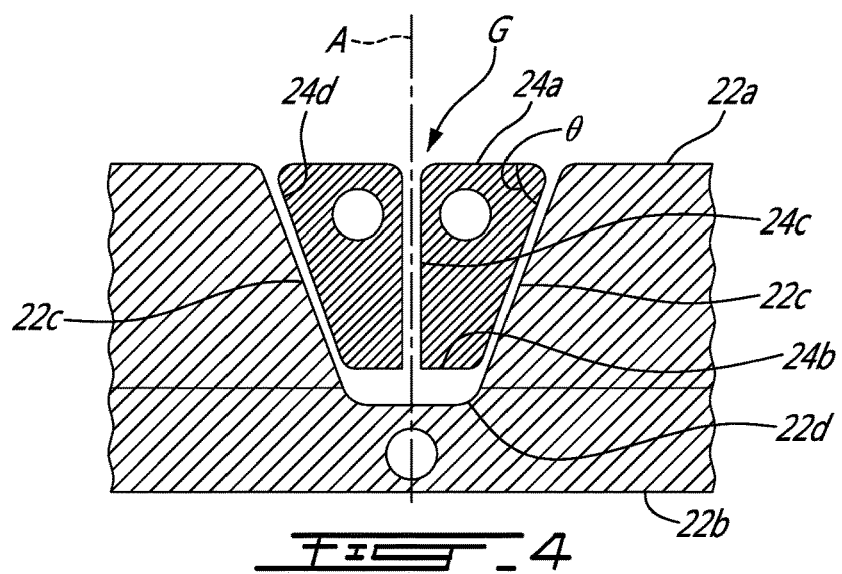
FIG. 4 is a schematic front view of the molding assembly of FIG. 3.

Referring to FIGS. 3 and 4, a molding assembly 20 is shown for forming the stiffener 12 with the panel 10. The molding assembly 20 includes a mold 22 that has a first surface 22a and a second surface 22b being opposite to the first surface 22a. The mold 22 is a "male" type mold, also known as an inner mold line tool, because it defines an inner side or surface of the panel 10. The inner side of the panel is the side on which the stiffeners 12 are located. A "male" type mold is opposed to a "female" type mold, also referred to as an outer mold line tool, in which the mold defines an outer side of the composite part. Using a "female" type mold is complex in that appropriate tooling is required over the inner side of the panel to fix a position of the stiffener during curing. The male mold 22 might overcome the drawbacks of "female" type molds as it does not require tooling to maintain a position of the stiffener 12.

In the depicted embodiment, the mold 22 has an upright orientation, and thus the first and second surfaces 22a, 22b are sometimes referred to herein as the top and bottom surfaces, respectively, of the mold 22. The mold 22 may have other orientations, such as a horizontal orientation or another orientation which is inclined with respect to a vertical line, in which case the first and second surfaces 22a, 22b would not be top and bottom surfaces.

The mold 22 defines a cavity C that extends along a centerline axis A and that extends inwardly from the top surface 22a toward the bottom surface 22b. The cavity C is bounded by two side walls 22c that converge toward each other from the top surface 22a toward the bottom surface 22b. In the depicted embodiment, a width of the cavity C decreases in a direction going from the top surface 22a to the bottom surface 22b. The cavity C narrows in the direction of the bottom surface 22b of the mold 22. Stated otherwise, a distance between the two side walls 22c decreases in the direction going from the top surface 22a to the bottom surface 22b. The centerline axis A extends from the bottom surface 22b and toward the top surface 22a and is spaced equidistantly from the two side walls 22c. As shown, the central axis A is perpendicular to the top surface 22a. In the depicted embodiment, the centerline axis A is substantially upright, and is spaced an equal distance from each side wall 22c along the height of the cavity C. More specifically, for a given location on the central axis A and between the top and bottom surfaces 22a, 22b, the distance from the given location to one of the two side walls 22c corresponds to the distance from the given location to the other of the two side walls 22c. The cavity C is bounded by a connecting wall 22d, which is a lower wall or floor in the depicted embodiment, that extends from one of the two side walls 22c to the other. In the depicted embodiment, the lower wall 22d is parallel to the top surface 22a of the mold 22.

The molding assembly 20 further includes two mandrels 24 that are each removably receivable, or insertable, in the cavity C. In the embodiment shown, the mandrels 24 have each a triangular prism shape, more specifically a trapezoidal prism shape. Each of the mandrels 24 has a first wall 24a and an opposite second wall 24b. The first wall 24a and the second wall 24b are spaced apart by the body of each mandrel 24, and in the depicted embodiment, are on opposite upper and lower sides of each mandrel 24. An inner wall 24c of each mandrel 24, and an outer wall 24d opposite to the inner wall 24c, both extend between and interconnect the first and second walls 24a, 24b. Once the two mandrels 24 are received in the cavity C, the outer walls 24d are adjacent to the two side walls 22c of the cavity C and the inner walls 24c of the mandrels 24 face each other. The inner walls 24c of the two mandrels 24 face each other and define a gap G therebetween. The gap G is configured for receiving a first pre-impregnated layer of composite material 12a' (see FIG. 5), also referred to as a first pre-impregnated segment, of the first composite segment 12a of the stiffener 12 to be cured, as will be described in greater detail below. The outer walls 24d of the two mandrels 24 are angled and each slidably engages one of the side walls 22c that delimit the cavity C.

For each of the two mandrels 24, an angle θ is defined between the outer wall 24d and the first wall 24a. The angle θ may vary, and is less than 90° in the depicted embodiment. The outer walls 24d of the mandrels 24 are inclined or angled at the angle θ. The angle θ may be in a range of values from 15 to 25 degrees. The angle θ may be 20 degrees. Each of the two side walls 22c of the cavity C define an angle α (see FIG. 5) with the first surface 22a of the mold 22. A value of the angle α is equal to a value of the angle θ defined between the outer wall 24d and the first wall 24a. Stated otherwise, each of the outer walls 24d of the mandrels 24 are parallel to a corresponding one of the side walls 22c of the cavity C upon the mandrels 24 being received in the cavity C.

In the embodiment shown, the inner walls 24c of the mandrels 24 are normal to the top surface 22a of the mold 22 when the mandrels 24 are positioned in the cavity C. The inner wall 24c of each mandrel 24 is normal to the first wall 24A of the same mandrel 24. Having the inner walls 24c of the mandrels 24 being normal to the first walls 24a allows forming a T-shape stiffener where the first composite segment 12a is normal to the second composite segment 12b. As illustrated in FIGS. 3 to 4, the inner walls 24c of the mandrels 24 are parallel to one another when the mandrels 24 are disposed in the cavity C. Such a configuration allows the first composite segment 12a of the stiffener 12 to have a constant thickness. Other configurations for the inner walls 24c are contemplated depending of a desired shape for the stiffener 12.

Figure 5:
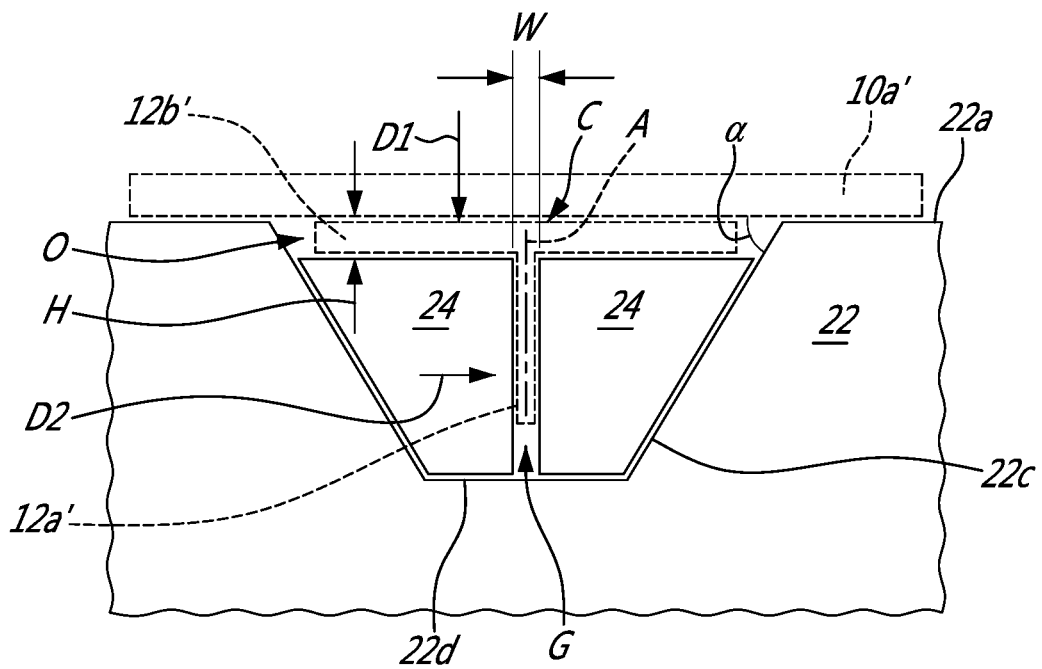
FIG. 5 is another schematic front view of the molding assembly of FIG. 3.

Referring to FIG. 5, the mandrels 24 are displaceable into the cavity C toward the lower wall 22d of the mold 22 in response to a pressure applied to the first walls 24a of the mandrels 24. Displacement of the mandrels 24 along a first direction D1 normal to the top surface 22a displaces the inner walls 24c toward each other in a direction D2 that is transverse to the centerline axis A and normal to the first direction D1 such that they abut against the first pre-impregnated layer of composite material 12a' of the first composite segment 12a of the stiffener 12 located in the gap G. More particularly, as the mandrels 24 are displaced along the direction D1 into the narrowing cavity C toward its lower wall 22d, the outer walls 24d of the mandrels 24 are forced to abut against, and slide along, side walls 22c of the cavity C. As the mandrels 24 descend further into the narrowing cavity C, the side walls 22c of the cavity C will exert a pressure on the outer walls 24d of the mandrels 24, which will in turn cause the inner walls 24c of the mandrels 24 to squeeze the first pre-impregnated layer of composite material 12a' of the first composite segment 12a of the stiffener 12 in the gap G. The pressure applied on the first walls 24a of the mandrels 24 therefore translates in the mandrels 24 moving toward each other and results in a decrease in a width W of the gap G. Doing so squeezes the first pre-impregnated layer of composite material 12a' of the first composite segment 12a of the stiffener 12 to its desired thickness. Stated otherwise, movements of the two mandrels 24a along the first direction D1 translates, via the correspondingly angled side walls 22c of the cavity C and the outer walls 24d of the mandrels 24, in the translation of the two mandrels 24 along the second direction D2 toward each other.

In the embodiment shown, the mandrels 24 are movable along the second direction D2, which is transverse to the central axis A, until the second walls 24b of the mandrels 24 abut the lower wall 22d of the cavity C. The width W of the gap G has its smallest value when the second walls 24b of the mandrels 24 abut the lower wall 22d of the cavity C. Stated differently, the width W of the gap G decreases as the mandrels 24 are displaced in direction D1 until the width W achieves its smallest value when the second walls 24b of the mandrel 24 abut the lower wall 22d of the cavity C. In the embodiment shown, the gap G is still present, and has a width W greater than 0, when the mandrel 24 is in abutment with the lower wall 22d of the cavity C. In a particular embodiment, a minimal value of the width W of the gap G corresponds to a calculated value of a thickness of cured plies of the first composite segment 12a of the stiffener 12.

Still referring to FIG. 5, the first walls 24a of the mandrels 24 define an offset O with the first surface 22a of the mold 22 upon the second walls 24b of the mandrels 24 being entirely received in the cavity C. In the depicted embodiment, a height H of the offset O corresponds to the width W of the gap G upon the second walls 24b of the mandrels 24 contacting the lower wall 22d of the cavity C. The offset O is configured for receiving a second pre-impregnated layer of composite material 12b', also referred to as a second pre-impregnated segment, over the first walls 24a of the mandrels 24 to form the second composite segment 12b of the stiffener 12. A thickness of the pre-impregnated layer of composite material 12b' is such that an upper surface thereof is flush with the first surface 22a of the mold 22. This allows a pre-impregnated layer of composite material 10a', also referred to as a pre-impregnated segment of the panel 10 for forming the panel 10a, to be flat when placed over the second pre-impregnated layer of composite material 12b' for forming the second segment 12b.

A molding assembly 20 having been described, a method of co-curing the panel 10 and the stiffener 12 extending therefrom is described in greater detail.

Referring to FIG. 5, the first pre-impregnated layer of composite material 12a' of the first composite segment 12a of the stiffener 12 is placed between the inner walls 24c of the two mandrels 24, and the second pre-impregnated layer of composite material 12b' of the second composite segment 12b of the stiffener 12 is placed on the first walls 24a of the mandrels 24. The pre-impregnated layer of composite materials 12a', 12b' of the first and second composite segments 12a, 12b of the stiffener 12 and the mandrels 24 are inserted in the cavity C of the mold 22. The angled outer walls 24d of the mandrels 24 are abutted against the correspondingly angled side walls 22c of the mold 22. A pre-impregnated layer of composite material 10a' for forming the panel composite segment 10a of the panel 10 is placed over the second pre-impregnated layer of composite material 12b' of the second composite segment 12b of the stiffener 12 and over the first surface 22a of the mold 22. Pressure is applied on the first walls 24a of the two mandrels 24 to move the mandrels 24 toward each other along the second direction D2 such that the mandrels apply pressure on the first pre-impregnated layer of composite material 12a' of the first segment 12a of the stiffener 12. The pre-impregnated layer of composite materials 10a', 12a', 12b' of the panel composite segment 10a of the panel 10, and of the first and second composite segments 12a, 12b of the stiffener 12, are cured.

Figure 6:
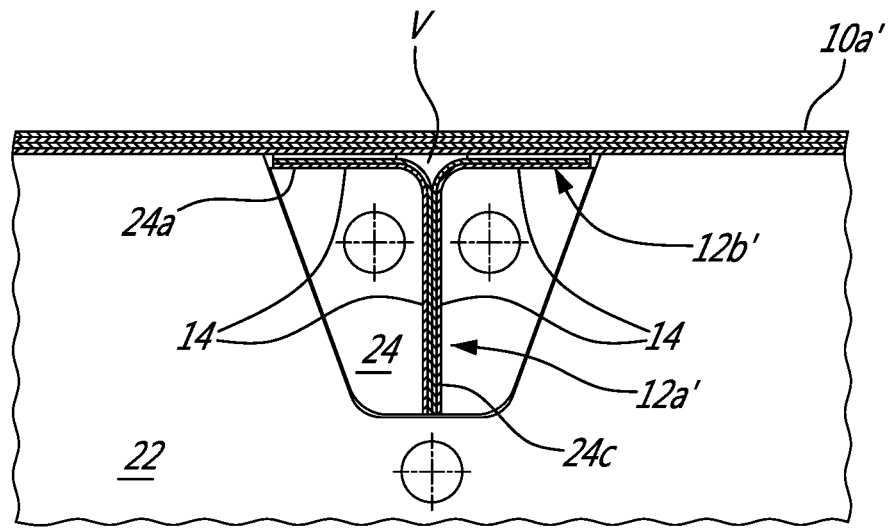
FIG. 6 is another schematic front view of the molding assembly of FIG. 3.

Referring also to FIG. 6, the first and second composite segments 12a, 12b of the stiffener are made by two pre-impregnated sections 14 that are each debulked, or bent, to define each a half of the first pre-impregnated layer of composite materials 12a' and a half of the second pre-impregnated layer of composite materials 12b'. In other words, the two pre-impregnated sections 14 are bent to define each an L-shape that are secured to each other to define the T-shape of the stiffener 12. In the embodiment shown, placing the first pre-impregnated segment 12a' and placing the second pre-impregnated segment 12b' includes laying each of the two pre-impregnated sections 14 along the first wall 24a and the inner wall 24c of a respective one of the two mandrels 24. Then, the mandrels 24 are aligned side by side such that the two pre-impregnated sections 14 contact each other between the inner walls 24c of the mandrels 24.

In the depicted embodiment, a void V is created between the two pre-impregnated sections 14 and the pre-impregnated layer of composite materials 10a' of the panel composite segment 10a. The void V may be filled with pre-impregnated material before the curing.

Referring to FIGS. 3 and 5, applying pressure on the first walls 24a of the mandrels 24 includes removing air, for example by vacuum, out of a bag B containing the pre-impregnated layer of composite materials 12a', 12b' of the first and second composite segments 12a, 12b of the panel 12, the pre-impregnated layer of composite material 10a' of the composite segment 10a of the panel 10, the mandrels 24, and the mold 22. As illustrated, applying pressure on the first walls 24a of the mandrels 24 includes moving the mandrels 24 toward each other until the second walls 24b of the mandrels 24 are in abutment against the lower wall 22d of the cavity 22. Applying pressure on the first walls 24a of the mandrels 24 includes moving the mandrels 24 toward each other by sliding the angled outer walls 24d of the mandrels 24 against the angled side walls 22c of the mold 22 towards an end of the cavity C.

In the depicted embodiment, curing the pre-impregnated layer of composite material 10a' of the panel 10 and the first and second pre-impregnated layers of composite material 12a', 12b' of the stiffener 12 includes heating the pre-impregnated layer of composite material 10a' of the panel 10 and the first and second pre-impregnated layer of composite material 12a', 12b' of the stiffener 12. The heating of the pre-impregnated layer of composite material 10a' of the panel 10 and the first and second pre-impregnated layer of composite material 12a', 12b' of the stiffener 12 may be performed in an autoclave. An ambient air pressure may be increased during the heating. The mandrels 24 may allow the co-curing of both of the first and second pre-impregnated layer of composite material 12a', 12b' of the stiffener 12 by transferring an air pressure inside the autoclave that is perpendicular to the second pre-impregnated layer of composite material 12b' to a pressure being perpendicular to the first pre-impregnated layer of composite material 12a'.

Still referring to FIG. 5, inserting the first and second pre-impregnated layers of composite material 12a', 12b' of the stiffener 12 and the two mandrels 24 in the cavity C includes inserting the first and second pre-impregnated layers of composite material 12a', 12b' of the stiffener 12 and the two mandrels 24 along the first direction D1, which is normal to the top surface 22a of the mold 22.

In the specification, reference may be made to the spatial relationships between various components and to the spatial orientation of various aspects of components as the devices are depicted in the attached drawings. However, the devices, members, apparatuses, etc. described herein may be positioned in any desired orientation. Thus, the use of terms such as "top", "bottom", "above", "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

What is claimed is:

1. A molding assembly, comprising:
   a mold having a first surface and an opposed second surface, the mold defining a cavity being bounded by two side walls converging toward each other from the first surface toward the second surface and by a connecting wall extending between the two side walls, the cavity having a centerline axis extending between the first and second surfaces and spaced equidistantly from the side walls, the cavity dividing the first surface into a first surface segment extending from one side wall of the two side walls and a second surface segment extending from the other side wall of the two side walls; and
   two mandrels each being removably receivable in the cavity and having a first wall, a second wall opposed to the first wall, an inner wall, and an outer wall opposed to the inner wall, the inner wall and the outer wall extending from the first wall to the second wall, the inner walls facing each other and defining a gap therebetween upon the two mandrels being received in the cavity, an entirety of each of the first walls lying in a single plane, the single plane being perpendicular to the centerline axis of the cavity upon the two mandrels being received in the cavity, the gap configured for receiving a composite material to be cured, the outer walls being angled and each slidably engaging a respective one of the two side walls, an offset being defined between the entirety of the first walls of the mandrels lying in the single plane and a second plane containing both the first surface segment and the second surface segment of the first surface of the mold upon the outer walls engaging the side walls and upon the second walls of the two mandrels contacting the connecting wall of the mold, a height of the offset corresponding to a width of the gap upon the outer walls engaging the side walls.

2. The molding assembly of claim 1, wherein a value of an angle defined between each of the two side walls and the first surface is equal to a value of an angle defined between each of the outer walls and each of the first walls.

3. The molding assembly of claim 1, wherein each of the outer walls define an angle between 15° and 25° with the first wall.

4. The molding assembly of claim 1, wherein the inner wall of each mandrel is normal to the first wall.

5. The molding assembly of claim 1, wherein the inner walls of the two mandrels are parallel to one another upon the two mandrels being received in the cavity.

6. The molding assembly of claim 1, wherein the first wall of each mandrel is an uppermost wall of each mandrel and the second wall of each mandrel is a lowermost wall of each mandrel, the inner wall of each mandrel extending between the uppermost and lowermost walls of each mandrel, the gap defined between the inner walls having a constant width between the uppermost and lowermost walls of the mandrels.

7. The molding assembly of claim 1, wherein the height of the offset corresponds to the width of the gap upon the second walls of the two mandrels contacting the connecting wall of the cavity.

8. A method of co-curing a panel and a stiffener extending therefrom, the method comprising:
   placing a first pre-impregnated segment of the stiffener between inner walls of two mandrels and placing a second pre-impregnated segment of the stiffener on first walls of the mandrels being transverse to the inner walls, an entirety of each of the first walls lying in a single plane, the single plane being perpendicular to the inner walls;
   inserting the first and second pre-impregnated segments of the stiffener and the mandrels in a cavity of a mold;
   abutting angled outer walls of the mandrels against correspondingly angled side walls of the mold and abutting an end of the mandrels against an end of the cavity of the mold to define an offset being between the first walls lying in the single plane and two exposed surfaces of the mold on opposite sides of the cavity and contained in a second plane, the second pre-impregnated segment of the stiffener disposed in the offset, a height of the offset corresponding to a thickness of the first pre-impregnated segment of the stiffener between the inner walls of the two mandrels;
   placing a pre-impregnated segment of the panel over the second pre-impregnated segment of the stiffener and over the two exposed surfaces of the mold;
   applying pressure on the first walls of the mandrels to move the mandrels toward each other such that the mandrels apply pressure on the first pre-impregnated segment of the stiffener disposed therebetween; and
   curing the pre-impregnated segment of the panel and the first and second pre-impregnated segments of the stiffener.

9. The method of claim 8, wherein the first pre-impregnated segment and the second pre-impregnated segment are defined by two pre-impregnated sections, placing the first pre-impregnated segment and placing the second pre-impregnated segment includes laying each of the two pre-impregnated sections along the first wall and the inner wall of a respective one of the two mandrels.

10. The method of claim 8, wherein applying pressure on the first walls of the mandrels includes removing air from a bag containing the first and second pre-impregnated segments of the stiffener, the pre-impregnated segment of the panel, the mandrels and the mold.

11. The method of claim 8, wherein applying pressure on the first walls of the mandrels includes moving the mandrels toward each other by sliding the angled outer walls of the mandrels against the angled side walls of the mold towards the end of the cavity.

12. The method of claim 8, wherein curing the pre-impregnated segment of the panel and the first and second pre-impregnated segments of the stiffener includes heating the pre-impregnated segment of the panel and the first and second pre-impregnated segments of the stiffener.

13. The method of claim 12, further comprising increasing an ambient air pressure while heating the pre-impregnated segment of the panel and the first and second pre-impregnated segments of the stiffener.

14. A molding assembly, comprising:
  a mold having a first surface and an opposed second surface, and a cavity extending inwardly from the first surface toward the second surface, the cavity being bounded by two side walls converging toward each other from the first surface toward the second surface and by a connecting wall extending between the two side walls, the cavity having a centerline axis extending between the first and second surfaces and spaced equidistantly from the side walls, the cavity dividing the first surface into a first surface segment extending from one side wall of the two side walls and a second surface segment extending from the other side wall of the two side walls;
  two mandrels each having a first wall, a second wall opposite to the first wall, an outer wall, and an inner wall opposite to the outer wall, the inner and outer walls extending between the first and second walls, the mandrels being removably insertable into the cavity to position the outer walls adjacent to the side walls of the cavity and to position the inner walls facing toward each other, the inner walls being spaced apart and defining a gap therebetween to receive a segment of a composite material to be cured, an entirety of each of the first walls lying in a single plane, the single plane being perpendicular to the centerline axis of the cavity upon the mandrels being inserted into the cavity, an offset being defined between the entirety of the first walls of the mandrels lying in the single plane and a second plane containing both the first surface segment and the second surface segment of the first surface of the mold upon the outer walls being adjacent to the side walls and upon the second walls of the two mandrels contacting the connecting wall of the mold, a height of the offset corresponding to a width of the gap upon the outer walls being adjacent to the side walls; and
  a vacuum bag to enclose the mold, the mandrels and the composite material, the vacuum bag operable to generate a pressure applicable against the first walls of the mandrels to displace the mandrels into the cavity toward the second surface of the mold, displacement of the mandrels slidingly displacing the outer walls against the side walls of the cavity and displacing the inner walls toward each other in a direction transverse to the centerline axis to abut against the segment of the composite material in the gap.

15. The molding assembly of claim 14, wherein a value of an angle defined between each of the two side walls and the first surface is equal to a value of an angle defined between each of the outer walls and each of the first walls.

16. The molding assembly of claim 14, wherein the inner wall of each mandrel is normal to the first wall.

17. The molding assembly of claim 14, wherein the inner walls of the mandrels are parallel to one another upon the mandrels being displaced in the cavity.

18. The molding assembly of claim 14, wherein the height of the offset corresponds to the width of the gap upon the second walls of the two mandrels contacting the connecting wall.

19. The molding assembly of claim 14, wherein the first wall of each mandrel is an uppermost wall of each mandrel and the second wall of each mandrel is a lowermost wall of each mandrel, the inner wall of each mandrel extending between the uppermost and lowermost walls of each mandrel and lying in only one plane.

\* \* \* \* \*